United States Patent
Yu et al.

(10) Patent No.: US 8,492,046 B2
(45) Date of Patent: Jul. 23, 2013

(54) METHOD OF MITIGATING FUEL CELL DEGRADATION DUE TO STARTUP AND SHUTDOWN VIA HYDROGEN/NITROGEN STORAGE

(75) Inventors: Paul Taichiang Yu, Pittsford, NY (US); Frederick T. Wagner, Fairport, NY (US); Glenn W. Skala, Churchville, NY (US); Balsu Lakshmanan, Pittsford, NY (US); John P. Salvador, Penfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1646 days.

(21) Appl. No.: 11/612,120

(22) Filed: Dec. 18, 2006

(65) Prior Publication Data
US 2008/0145716 A1    Jun. 19, 2008

(51) Int. Cl.
*H01M 8/04*    (2006.01)

(52) U.S. Cl.
USPC .......................................... 429/443; 429/429

(58) Field of Classification Search
None
See application file for complete search history.

(56) References Cited

U.S. PATENT DOCUMENTS

| | | | |
|---|---|---|---|
| 6,025,083 A | 2/2000 | Veyo et al. | |
| 6,514,635 B2 | 2/2003 | Van Dine et al. | |
| 6,635,370 B2 | 10/2003 | Condit et al. | |
| 6,835,479 B2 * | 12/2004 | Balliet et al. ................. | 429/429 |
| 6,858,336 B2 | 2/2005 | Reiser et al. | |
| 6,887,599 B2 | 5/2005 | Reiser et al. | |
| 6,896,982 B2 * | 5/2005 | Jia et al. ........................ | 429/413 |
| 2002/0076582 A1 | 6/2002 | Reiser et al. | |
| 2002/0076583 A1 | 6/2002 | Reiser et al. | |
| 2002/0098393 A1 | 7/2002 | Dine et al. | |
| 2002/0102443 A1 | 8/2002 | Yang et al. | |
| 2003/0198845 A1 | 10/2003 | Nakanishi et al. | |
| 2004/0081866 A1 | 4/2004 | Bekkedahl et al. | |
| 2006/0046106 A1 | 3/2006 | Yu et al. | |
| 2007/0166582 A1 | 7/2007 | Okamoto | |

FOREIGN PATENT DOCUMENTS

| | | |
|---|---|---|
| JP | 6333586 A | 12/1994 |
| JP | 2005093115 | 4/2005 |
| JP | 2005235427 A | 9/2005 |
| JP | 2006156040 A | 6/2006 |
| WO | 2006040999 A1 | 4/2006 |

OTHER PUBLICATIONS http://www.thefreedictionary.com/inject.*
English Translation of Japanese Office Action JP 2007-325659; date of Mailing May 11, 2011; 2 pages.

* cited by examiner

*Primary Examiner* — Helen O Conley
(74) *Attorney, Agent, or Firm* — BrooksGroup

(57) ABSTRACT

A method of operating the fuel cell stack having an anode side and a cathode side by flowing hydrogen into the anode side and flowing air into the cathode side. The fuel cell produces electricity that is used to operate a primary electrical device. To shut down the stack in one embodiment, the primary electrical device is disconnected from the stack. The flow of air into the cathode side is stopped and positive hydrogen pressure is maintained on the anode side. The fuel cell stack is shorted and oxygen in the cathode side is allowed to be consumed by hydrogen. The inlet and outlet valves of the anode and the cathode sides are closed. Thereafter, the flow of hydrogen into the anode side is stopped and the flow of exhaust from the cathode side is stopped.

8 Claims, 4 Drawing Sheets

METHOD OF MITIGATING FUEL CELL DEGRADATION DUE TO STARTUP AND SHUTDOWN VIA HYDROGEN/NITROGEN STORAGE

TECHNICAL FIELD

The field to which the disclosure generally relates includes methods of operating fuel cell stacks, including starting up and shutting down such fuel cell stacks.

BACKGROUND OF THE INVENTION

In vehicle applications, fuel cell stacks may be required to go through more than 30,000 startup/shutdown cycles. The normal operation of a fuel cell stack involves the continuous flow of hydrogen into the anode side and air into the cathode side of the fuel cell stack. When the fuel cell is shut down, if the electrical circuit is open and there is no longer a load across the cell, unacceptable anode and cathode potentials may develop, resulting in catalyst or catalyst support oxidation and corrosion, and fuel cell performance degradation.

SUMMARY OF EXEMPLARY EMBODIMENTS OF THE INVENTION

One embodiment of the invention includes a method of operating the fuel cell stack having an anode side and a cathode side by flowing hydrogen into the anode side and flowing air into the cathode side. The fuel cell produces electricity that is used to operate a primary electrical device. To shut down the stack, the primary electrical device is disconnected from the stack. The flow of air into the cathode side is stopped and positive hydrogen pressure is maintained on the anode side. The fuel cell stack is shorted and oxygen in the cathode side is allowed to be consumed by hydrogen from the anode side. The inlet and outlet valves of the anode and cathode sides are then closed.

Another embodiment of the invention includes operating a fuel cell stack having an anode side and a cathode side by flowing hydrogen into the anode side and flowing air into the cathode side. The fuel cell produces electricity which is used to operate a primary electrical device. To shut down the stack, the primary electrical device is disconnected from the stack and the stack is shorted. The flow of air into the cathode side is stopped and the exhaust from the cathode side is also stopped. The exhaust from the anode side is stopped while maintaining a positive hydrogen pressure on the anode side. Hydrogen is injected into the cathode side to consume the oxygen in the cathode side and to compensate the loss of the pressure at the cathode side due to the consumption of oxygen which has been consumed by both hydrogen injection and hydrogen crossing over from the anode side.

Other exemplary embodiments of the present invention will become apparent from the detailed description provided hereinafter. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings.

DETAILED DESCRIPTION OF EXEMPLARY EMBODIMENTS

The following description of the embodiment(s) is merely exemplary in nature and is in no way intended to limit the invention, its application, or uses.

Figure 1:
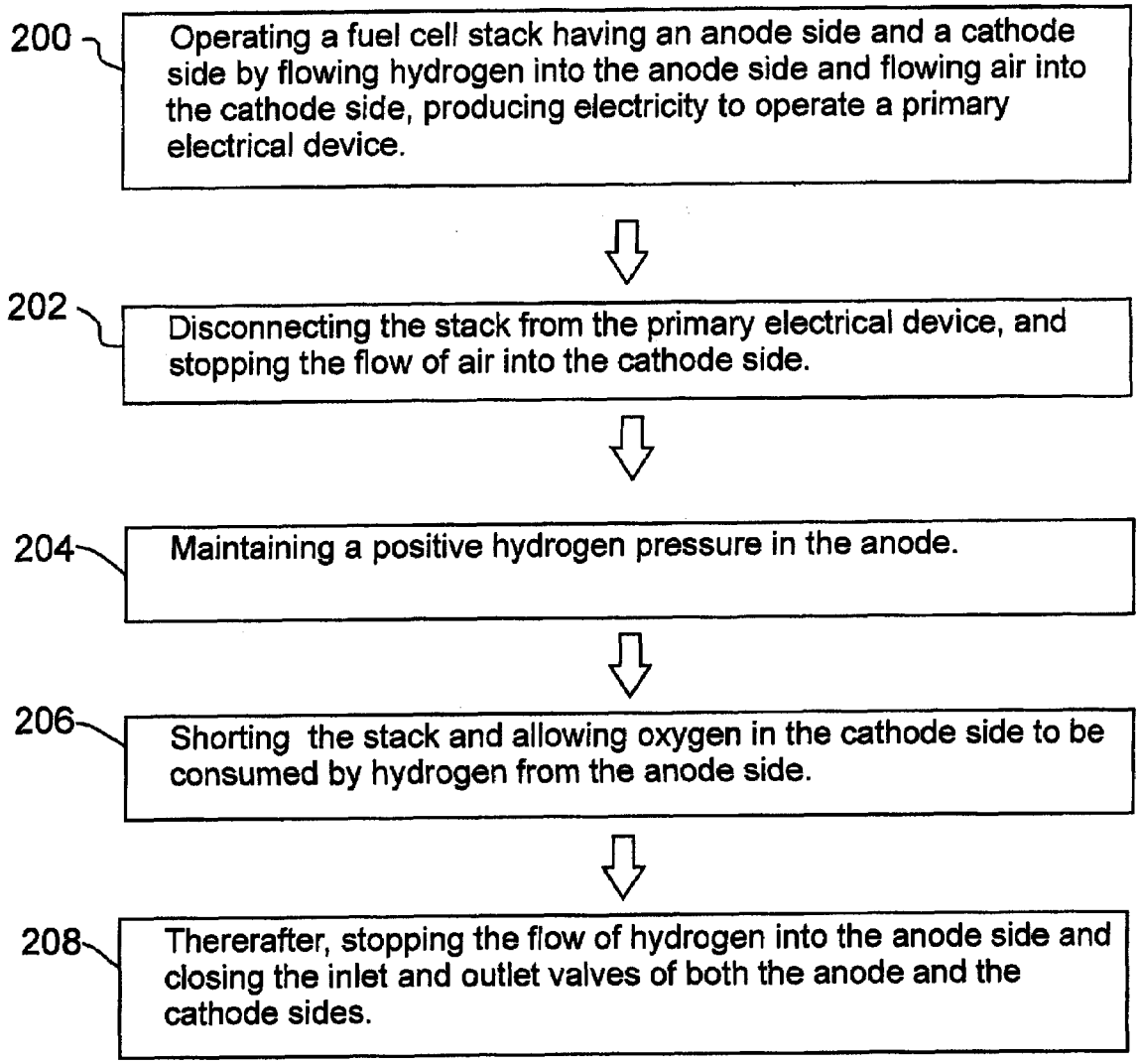
FIG. 1 is a flow chart illustrating a method according to one embodiment of the invention.

Referring now to FIG. 1, one embodiment of the invention includes operating a fuel cell stack having an anode side and a cathode side by flowing hydrogen into the anode side and flowing air into the cathode side, producing electricity to operate a primary electrical device (step 200). Shutting down the stack includes disconnecting the stack from the primary electrical device and stopping the flow of air into the cathode side (step 202). Maintaining a positive hydrogen pressure on the anode side (step 204). Shorting the fuel cell stack and allowing oxygen in the cathode side to be consumed by hydrogen from the anode side (Step 206). Thereafter, stopping the flow of hydrogen into the anode side and closing inlet and outlet valves of both the anode and cathode side (step 208). This positive hydrogen pressure in the anode should be at least sufficient to compensate for the loss of pressure due to the stack temperature decreasing from operating temperature to room temperature and the loss of pressure due to water vapor condensation.

Figure 2:
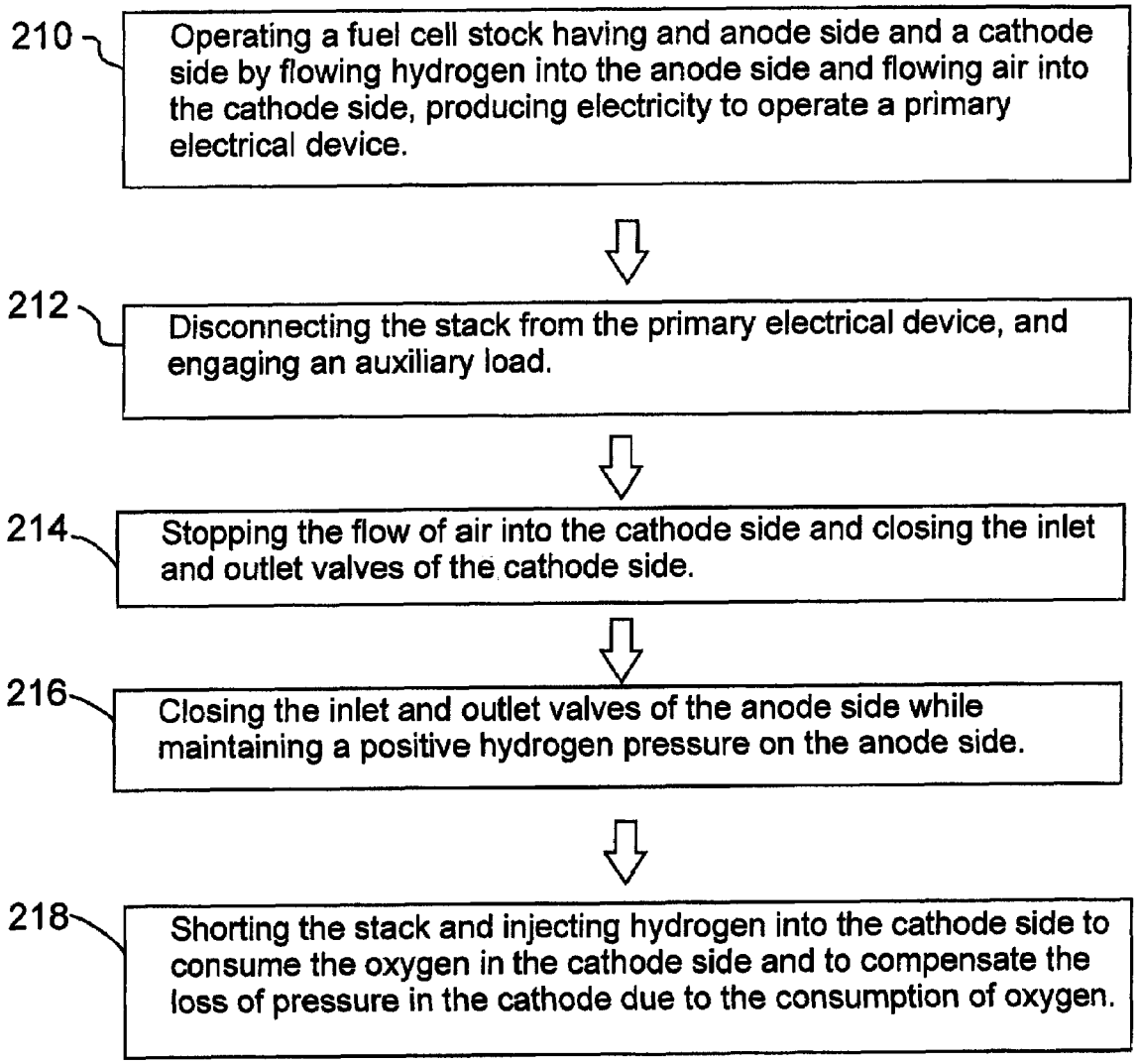
FIG. 2 is a flow chart illustrating a method according to another embodiment of the invention.

Referring now to FIG. 2, one embodiment of the invention includes a method of operating a fuel cell stack having an anode side and a cathode side by flowing hydrogen into the anode side and flowing air into the cathode side, and producing electricity to operate a primary electrical device (step 210). Shutting down the fuel cell stack includes disconnecting the stack from the primary electrical device and engaging an auxiliary load (step 212). Stopping the flow of air into the cathode side and closing the inlet and outlet valve of the cathode side (step 214). Closing the inlet and outlet valves on the anode side while maintaining a positive hydrogen pressure on the anode side (step 216). Shorting the stack and injecting hydrogen into the cathode side to consume the oxygen in the cathode side and to compensate for the loss of pressure due to the consumption of oxygen (step 218).

Figure 3:
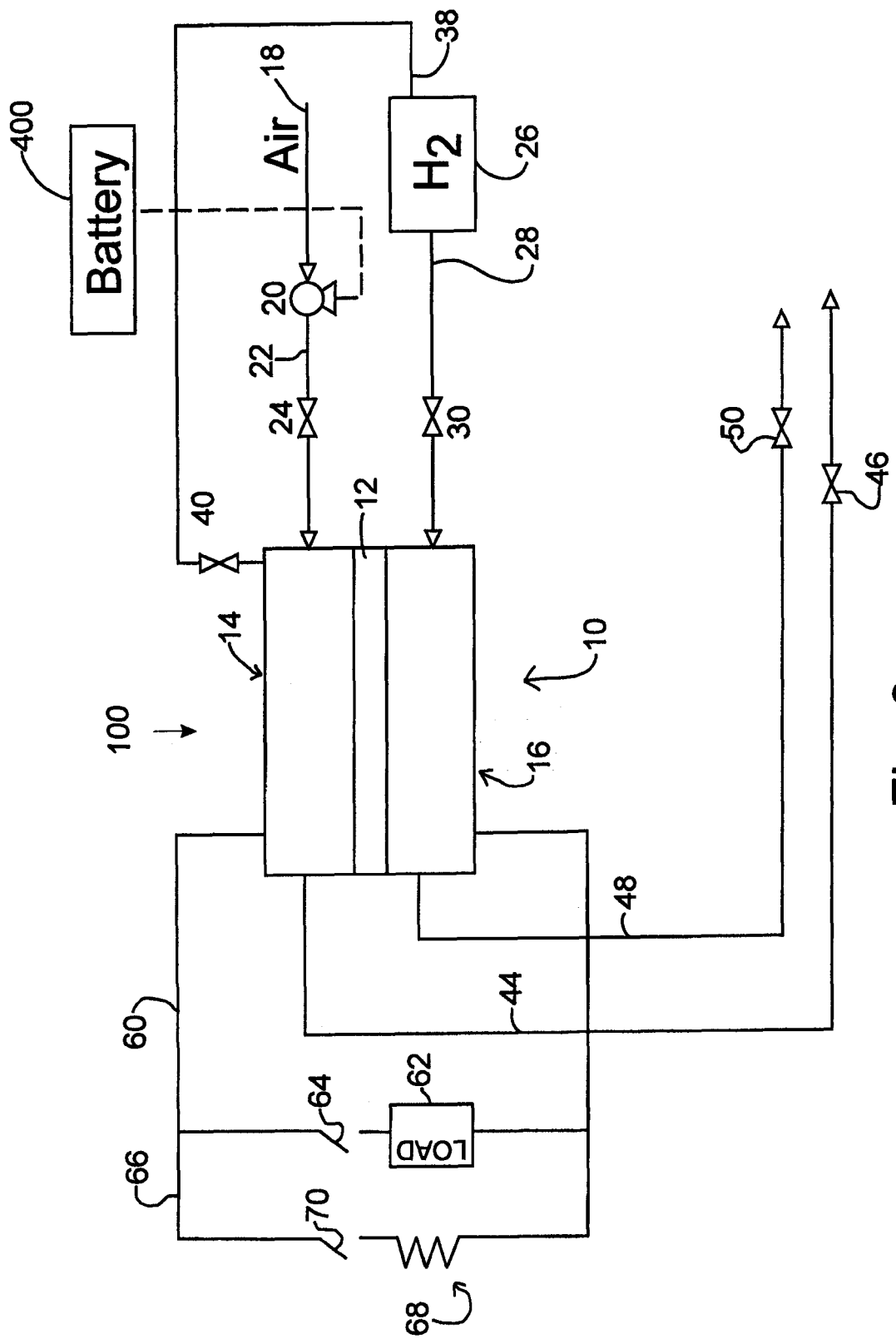
FIG. 3 is a schematic illustration of a fuel cell system and a method of operating the same according to one embodiment of the invention.

Referring now to FIG. 3, one embodiment of the invention includes a fuel cell system 100 including a fuel cell stack 10 which includes a solid polyelectrolyte membrane 12 and having an anode side 16 that includes an anode reactant gas flow field and a cathode side 14 which includes a cathode reacting gas flow field. An air inlet conduit 18 is provided and is connected to an air compressor 20. An air compressor outlet conduit 22 is connected from the compressor 20 to the cathode side 14 of the fuel cell stack 10 and a first valve 24 is provided in the air compressor outlet conduit 22. A hydrogen source 26 is provided, such as compressed hydrogen in a storage tank or liquid hydrogen in a storage tank. A first hydrogen tank outlet conduit 28 is provided connected at one end to the hydrogen source 26 and at a second end to the anode side 16 of a fuel cell stack 10. A second valve 30 is provided in the first hydrogen tank outlet conduit 28 to control the flow of gas therethrough. A second hydrogen tank outlet conduit 38 is provided and is connected at one end to the hydrogen source 26 and at the other end to the cathode side 14 of the fuel cell stack 10. A third valve 40 is provided in the second hydrogen tank outlet conduit 38 to control the flow of gas therethrough. A battery 400 may be connected to the air compressor 20 to power the same. Otherwise, the compressor 20 is powered by electricity generated by the fuel cell stack 10.

A cathode exhaust conduit 44 is provided connected to the fuel cell stack 10 at one end and includes a fourth valve 46 therein for controlling the flow of gas through the same. An anode exhaust conduit 48 is provided connected at one end to the fuel cell stack 10 and may be open at a second end to exhaust to the atmosphere. A fifth valve 50 is provided in the anode exhaust conduit 48 to control the flow of gas therethrough.

A first electrical path 60 is connected to the fuel cell stack 10 and includes a primary electrical device or load 62 and a first electrical switch 64 to connect and disconnect the load 62 from the fuel cell stack 10. The load 62 may be an electrical motor or an electrical machine for propelling a vehicle. A second electrical path 66 is connected to the fuel cell stack and includes a relatively low load device such as a resistor 68 and a second electrical switch 70 for connecting and disconnecting the resistor 68 to the fuel cell stack.

During normal operation of the fuel cell stack 10, the first valve 24 in the air compressor outlet conduit 22 is open and the fourth valve 46 in the cathode exhaust conduit 44 is also opened so that the air can be delivered through the cathode side 14 of the fuel cell stack. The second valve 30 in the first hydrogen tank outlet conduit 28 is opened and the fifth valve 50 in the anode exhaust conduit 48 is also opened so that hydrogen may be delivered through the anode side 16 of the fuel cell stack 10. In one embodiment, to shut down the fuel cell stack 10, hydrogen pressure is maintained on the anode side 16 at a pressure slightly above ambient in order to prevent air from intruding from ambient while the cathode is still filled with unconsumed oxygen. The primary load 62 is disconnected from the fuel cell stack 10 by opening the switch 64 in the first electrical path 60. Auxiliary power, for example from the battery 400, is utilized to operate various components of the fuel cell stack, including the air compressor 20. As such, an open circuit voltage is avoided. Thereafter, the first valve 24 in the air compressor outlet conduit 22 is closed as well as the fifth valve 50 in the anode exhaust conduit 48. The stack voltage begins to drop and the second electrical switch 70 in the second electrical path 66 is closed to connect the resistor 68 to the fuel cell stack 10 to short the stack 10. In one embodiment the second electrical switch 70 is closed after the stack voltage is approximately 0.2V/cell. When the cell voltage is down to approximately 0.05V, the oxygen in the cathode side has been completely consumed by hydrogen crossing over from the anode side 16 through the solid electrolyte membrane 12 to the cathode side 14. The cathode side 14 is now completely filled with nitrogen and water vapor. Thereafter, the fourth valve 46 in the cathode exhaust conduit 44 is closed and the second valve 30 in the first hydrogen tank outlet conduit is also closed maintaining a positive hydrogen pressure in the anode to compensate for the pressure loss due to stack temperature reduction and water vapor condensation. Air intrusion into the anode side 16 or cathode side 14 is consumed by retaining hydrogen in both the anode side and the cathode side. Both the cathode side 14 and anode side 16 are filled with a gas consisting essentially of hydrogen and nitrogen for shutdown storage.

Referring again to FIG. 3, another embodiment of the invention includes a method of shutting down the fuel cell stack, including maintaining hydrogen pressure in the anode side which is slightly above ambient pressure, disconnecting the stack 10 from the primary load 62 and using auxiliary power to avoid stack open cell voltage. The first valve 24 in the air compressor outlet conduit 22 is closed, as well as the fourth valve 46 in the cathode exhaust conduit 44. The fifth valve 50 in the anode side exhaust conduit 48 is closed and the third valve 40 in the second hydrogen tank outlet conduit 38 is opened to inject hydrogen into the cathode side 46 of the fuel cell to balance the pressure changes due to the hydrogen/oxygen reaction in the cathode side 14. Consequently, the stack voltage begins to drop and the fuel cell stack 10 is shorted by connecting the resistor 68 in the second electrical path 66 to the stack 10. In one embodiment the stack is shorted when the stack voltage is approximately 0.2V/cell. When the fuel cell voltage is down to approximately 0.05V, the oxygen in the cathode side 14 has been completely consumed by the hydrogen. The cathode side 14 is now filled with hydrogen/nitrogen and a slight amount of water. The anode side 16 is also filled with hydrogen. Again, air intrusion into the anode side 16 or cathode side 14 is consumed by hydrogen, and both the cathode side 14 and anode side 16 are filled with a gas consisting essentially of hydrogen and nitrogen for shutdown storage.

The fuel cell stack 10 may be started by opening the appropriate valves 30, 50 to allow hydrogen to flow through the anode side 16 of the fuel cell stack 10 while the stack is shorted followed by disconnecting the shorted stack. Thereafter, opening valves 24, 46 allowing air to flow through the cathode side 14. The third valve 40 is closed to prevent hydrogen from flowing into the cathode side 14. The second electrical switch 70 is opened to disconnect the resistor 68 from the fuel cell stack 10 and the first electrical switch 64 is closed to connect the primary load 62 to the fuel cell stack 10.

Figure 4:
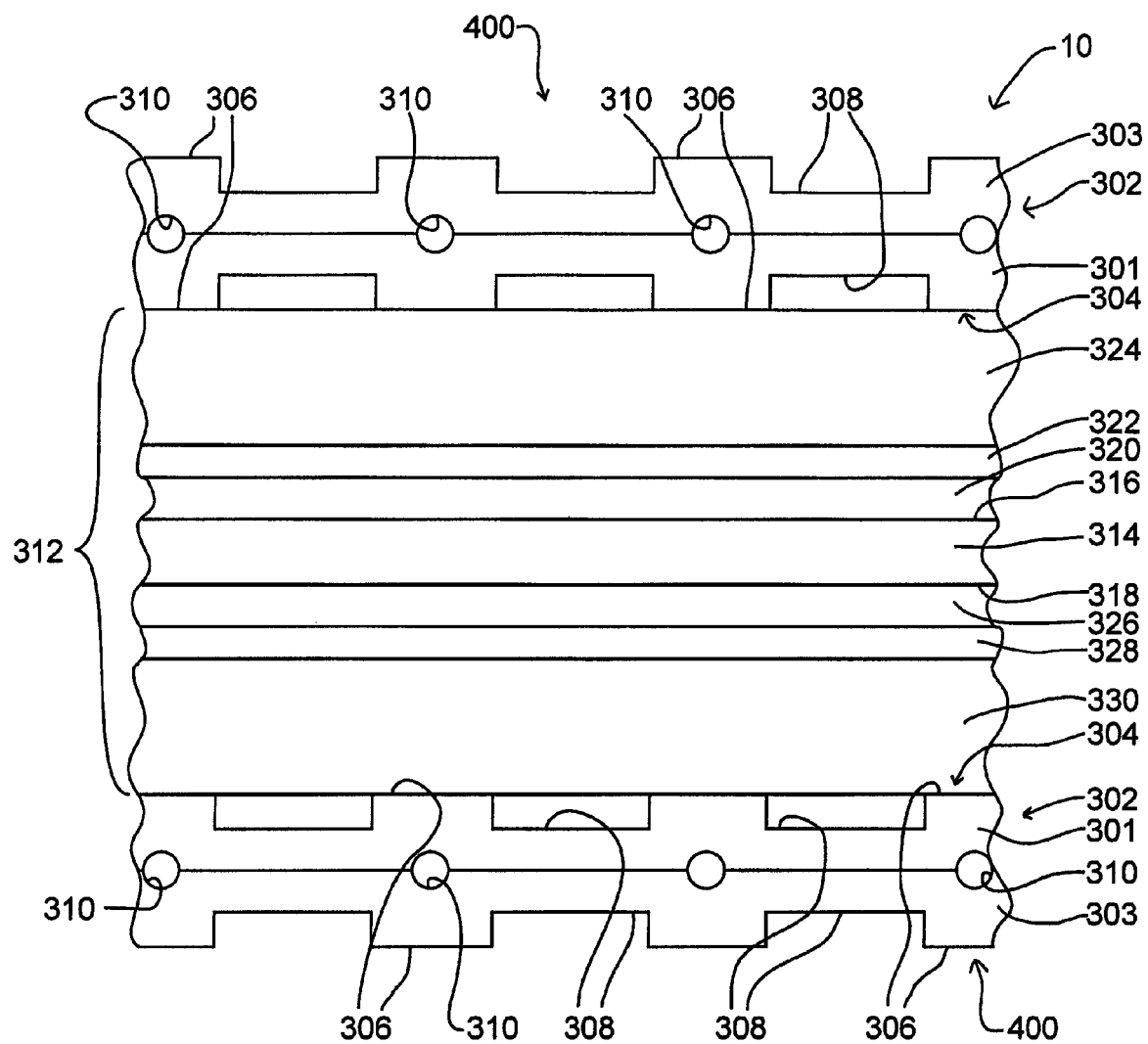
FIG. 4 illustrates a portion of a fuel cell stack according to one embodiment of the invention.

Referring now to FIG. 4, one embodiment of the invention may utilize a fuel cell stack 10 which includes a bipolar plate 302 and a soft goods portion 312. The bipolar plate 302 and the soft goods portion 312 are repeated to form a fuel cell stack with the bipolar plates 302 being connected in series. The bipolar plate 302 may be a single piece or may include a first piece 301 and a second piece 303 that have been secured together, for example by welding. The bipolar plate 302 may take on a variety of configurations including a metal substrate that has been machined, stamped metal foils secured together, or a molded electrically conductive composite material. The bipolar plate 302 may include a first face 304 having a plurality of lands 306 and channels 308 defined therein. The bipolar plate 302 may include a second face 400 which similarly includes a plurality of lands 306 and a plurality of channels 308 formed therein. The channels 308 on one side 304, for example, of the bipolar plate 302 may constitute the anode reactant gas flow field, and the channels 308 on the other side 400, for example, of the bipolar plate 302 may constitute the cathode reactant gas flow field. Cooling channels 310 may be provided in the bipolar plate 302.

The soft goods portion 312 may include a solid electrolyte membrane 314 having a first face 316 and an opposite second face 318. A porous cathode 320 may be provided on the first face 316 of the electrolyte membrane 314. The cathode 320 includes a catalyst and a conductive support, such as platinum on carbon particles, and an ionomer. A microporous layer 322 may be provided over the cathode 320. The microporous layer 322 has relatively small pores and may include particles in a binder, such as carbon particles and polytetrafluoroethylene (PTFE). A porous gas diffusion media layer 324 may be provided over the microporous layer 322. The porous gas diffusion media layer 324 may be any porous electrically conductive material, such as carbon paper or felt. The bipolar plate 302 may be provided over the gas diffusion media layer 324. A porous anode 326 may be provided underlying the second face 318 of the solid electrolyte membrane 314. The anode 326 includes a catalyst on an electrically conductive support, such as platinum on carbon particles, and an ionomer. A second microporous layer 328 may be provided underlying the anode 326. A second gas diffusion media layer 330 may be provided underlying the second microporous layer 328. Another bipolar plate 302 is shown underlying the second gas diffusion media layer 330.

When the term "air" is used to describe a reactant gas or a purge gas, such shall be deemed to be equivalent to an oxygen rich gas, such as oxygen rich air or pure oxygen.

The above description of embodiments of the invention is merely exemplary in nature and, thus, variations thereof are not to be regarded as a departure from the spirit and scope of the invention.

The invention claimed is:

1. A method comprising:
   operating a fuel cell stack having an anode side and a cathode side, the operating comprising flowing hydrogen into the anode side and flowing air comprising oxygen and nitrogen into the cathode side, producing electricity, and operating a primary electrical device connected to the stack using the electricity;
   shutting down the stack comprising:
   disconnecting the stack from the primary electrical device;
   stopping the flow of air comprising oxygen and nitrogen into the cathode side and maintaining a positive hydrogen pressure on the anode side;
   shorting the fuel cell stack and allowing oxygen in the cathode side to be consumed by hydrogen; wherein allowing oxygen in the cathode side to be consumed by hydrogen comprises injecting hydrogen gas into the cathode side;
   thereafter, stopping the flow of hydrogen into and out of the anode side and stopping the flow of exhaust from the cathode side.

2. A method as set forth in claim 1 wherein after stopping the flow of hydrogen into and out of the anode side and stopping the flow of exhaust from the cathode side, both the cathode side and the anode side have a gas therein consisting essentially of hydrogen and nitrogen.

3. A method as set forth in claim 1 wherein the positive hydrogen pressure in the anode is at least sufficient to compensate for the loss of pressure due to the stack temperature decreasing from operating temperature to room temperature and the loss of pressure due to water vapor condensation.

4. A method as set forth in claim 1 wherein the shorting the fuel cell stack comprises closing an electrical circuit including the fuel cell stack and a resistor.

5. A method comprising:
   operating a fuel cell stack having an anode side and a cathode side by flowing hydrogen into the anode side and flowing air comprising oxygen and nitrogen into the cathode side, producing electricity with a fuel cell stack and operating a primary electrical device connected to the fuel cell stack using the electricity;
   shutting down the fuel cell stack comprising disconnecting the fuel cell stack from the primary electrical device;
   stopping the flow of air comprising oxygen and nitrogen into the cathode side and stopping the exhaust from the cathode side;
   stopping the exhaust from the anode side while maintaining a positive hydrogen pressure on the anode side;
   shorting the fuel cell stack; and
   injecting hydrogen gas into the cathode side to consume the oxygen and to compensate the loss of the pressure due to the consumption of oxygen in the cathode side while the cathode side exhaust line remain closed.

6. A method as set forth in claim 5 wherein the shorting the fuel cell stack comprises closing an electrical circuit including the fuel cell stack and a resistor.

7. A method as set forth in claim 5 wherein the allowing oxygen in the cathode side to be consumed by hydrogen comprises allowing hydrogen to cross over from the anode side to the cathode side to consume the oxygen.

8. A method as set forth in claim 5 wherein after stopping the flow of hydrogen into the anode side and stopping the flow of exhaust from the cathode side, both the cathode side and the anode side have a gas therein consisting essentially of hydrogen and nitrogen.

* * * * *